UNITED STATES PATENT OFFICE.

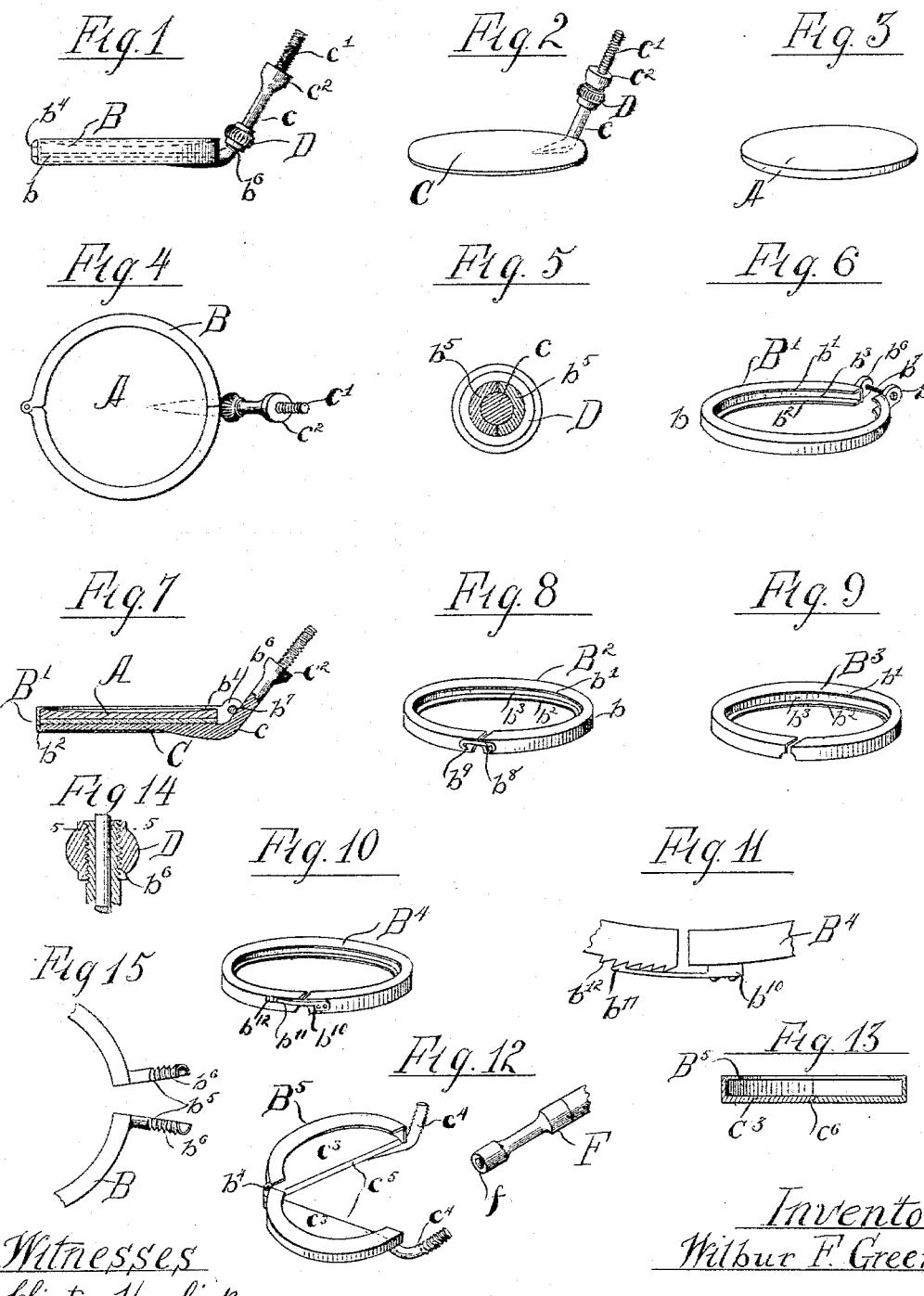

WILBUR FISK GREEN, OF EVANSTON, ILLINOIS.

DENTAL MOUTH-MIRROR.

SPECIFICATION forming part of Letters Patent No. 531,795, dated January 1, 1895.

Application filed August 11, 1894. Serial No. 520,034. (No model.)

*To all whom it may concern:*

Be it known that I, WILBUR FISK GREEN, of Evanston, in the county of Cook and State of Illinois, have invented certain new and useful Improvements in Dentists' Mouth-Mirrors; and I do hereby declare that the following is a full, clear, and exact description thereof, reference being had to the accompanying drawings, and to the letters of reference marked thereon, which form a part of this specification.

This invention relates to dentists' mouth mirrors, and it has for its object to provide a device of this character wherein the glass or mirror proper is removably secured within the frame in such manner that it may be quickly and conveniently taken out and replaced with another. Heretofore mirrors of this character have usually been constructed with the glass permanently secured within the frame, or at least so secured as to render it extremely inconvenient to remove the glass. This has been a serious objection because of the fact that dentists' mirrors are peculiarly liable to be scratched or broken by abrading instruments used by the operator, and when thus defaced the mirror is either rendered entirely useless or a new glass must be substituted.

By my improved construction all difficulty in removing and replacing the glasses is obviated, and the dentist himself may keep on hand a supply of glasses from which a new glass to replace one spoiled by an abrading tool may be quickly and easily inserted in the frame or holder.

The invention also includes means by which my improved construction may be adapted to some of the forms of dental mirrors now in common use at a very slight expense.

The invention consists in the matters hereinafter described and particularly pointed out in the appended claims, and the same will be more readily understood by reference to the accompanying drawings, in which—

Figure 1 is a view in side elevation of a mirror embodying my invention, the handle being omitted. Fig. 2 is a perspective view of the device with clasping ring and glass removed. Fig. 3 is a perspective of the glass or mirror proper. Fig. 4 is a plan view. Fig. 5 is a transverse section enlarged, taken on line 5—5 of Fig. 14. Fig. 6 is a perspective view of a modified form of clasping ring. Fig. 7 is a central vertical section, showing a mirror equipped with the ring shown in Fig. 6. Figs. 8, 9, and 10 are perspectives of various modifications in the form of the clasping ring and the means for securing them in position. Fig. 11 is an enlarged detail of the adjustable catch shown in Fig. 10. Fig. 12 is a perspective of still another modified form of the device. Fig. 13 is a central vertical section, taken at right angles to the handle, of the device shown in Fig. 12. Fig. 14 is an axial section of a portion of the shank of the device shown in Fig. 1. Fig. 15 is a broken perspective view of the ends of the clasping ring shown in Fig. 1.

As shown in said drawings, Figs. 1 to 5 inclusive, A designates the mirror proper or glass; B, the embracing ring or frame for the glass, and C a disk forming the bottom wall or back of the frame. The glass A is of the usual kind, being slightly concave or flat if desired, and herein shown as perfectly round. The ring or frame B is formed with straight cylindric sides $b$ and provided with inturned flanges $b'$ $b^2$ at its upper and lower edges, respectively, thus forming a groove or annular recess $b^3$ on the inner side of said ring. The groove $b^3$ is of proper width to receive the edges of the bottom C and superposed glass A. The ring B is split or cut in halves transversely and provided at one side with a hinge $b^4$ permitting its parts to swing from each other or open out in the plane of the frame. On each side of the cut in the ring opposite the hinge is secured one half $b^5$ $b^5$ of a split sleeve so arranged as to embrace an obliquely arranged shank $c$ formed integrally with or secured upon the bottom C. The ends of said split sleeve are exteriorly screw threaded, as shown at $b^6$, Fig. 14. D is an internally screw threaded collar loosely mounted upon the shank $c$, and adapted to be screwed down upon the ends of the split sleeve, whereby the latter are clamped upon the said shank $c$ and the two halves of the ring drawn closely together. The collar D is preferably knurled so as to afford a proper hold for the fingers in placing it upon or removing it from the sleeve. The end $c'$ of the shank is suitably formed for attachment to a handle, being preferably, and as herein shown, provided with screw threads adapted to fit within a threaded socket in the end of the handle. An enlargement or annular shoulder $c^2$ on said shank serves to limit the extent to which the shank may be inserted within the handle, and also forms a suitable finish at the juncture of the parts.

Figs. 6 and 7 represent a modification in which the ring B' is made of spring metal and cut or opened at one side only. Radially extending ears or lugs $b^6$ $b^6$ are provided on the exterior of the ring at each side of the opening, and a clamping screw $b^7$ is inserted through said ears, by means of which the ring may be drawn tightly around the glass A and bottom plate C to firmly clasp and hold said parts. The ears $b^6$ are each set back from their respective ends of the ring so as to provide space for the shank $c$; the clamping screw $b^7$, when the parts are assembled, passing over the shank, as clearly shown in Fig. 7.

Fig. 8 shows a modification of the ring $B^2$. Said ring is generally similar to that last described, but is provided with a pivoted catch $b^8$ and lug $b^9$ in lieu of the ears and clamping screw of the former construction.

Fig. 9 illustrates a construction of the ring $B^3$ in which securing devices are entirely dispensed with, and the resiliency of the ring itself, which is formed of spring metal, hard rubber, or the like, is depended upon to provide the necessary clasping action.

Figs. 10 and 11 illustrate a form of the ring $B^4$ in which a spring catch $b^{10}$, having an inturned or hooked end $b^{11}$, is rigidly secured at one side of the opening of the ring and adapted to engage any one of a series of ratchet shaped notches $b^{12}$ formed in the outer periphery of the ring. With this construction the ring may be compressed or squeezed together to a desired degree when the spring catch will automatically engage and hold it together.

Figs. 12 and 13 illustrate still another modification, in which a ring $B^5$, generally similar to that shown in Figs. 1 and 4, is provided with integral bottom sections $c^3$ in lieu of the removable bottom wall C of said former figures. Split shank portions $c^4$ $c^4$, generally similar to the split sleeve portions $b^5$ $b^5$, are secured to said bottom sections $c^3$ $c^3$. The shank portions $c^4$ are in this instance adapted to be brought together and screwed directly into a suitable socket $f$ formed in the end of the handle F in an obvious manner. In order that the bottom sections $c^3$ $c^3$ may fit closely together at their meeting edges $c^5$ $c^5$ so as to effectually exclude moisture, said edges are overlapped and beveled as seen at $c^6$, Fig. 13.

It will be obvious that still other modifications might be devised, but the above are deemed amply sufficient to illustrate the general principle of the invention. I do not, therefore, desire to be limited to specific details of construction, but desire to secure broadly the novel features set forth, except so far as the details are herein claimed as parts of the invention.

I claim as my invention—

1. A dentist's mouth mirror, comprising a handle, a glass, and a frame which surrounds the glass and is attached to the handle, said frame comprising a split, flexible, grooved ring adapted to engage the edge of the glass, substantially as described.

2. A dentist's mouth mirror, comprising a handle, a glass, and a frame which surrounds the glass and is attached to the handle, said frame comprising a split, flexible, grooved ring adapted to engage the edge of the glass, and clamping or holding means for engaging the ends of the ring to draw the same together, substantially as described.

3. A dentist's mouth mirror, comprising a handle, a glass, a back for said glass, a split flexible frame which surrounds said glass and back and is provided at one side with divided shank portions and means engaging said divided shank portions for drawing the same together to clamp the frame about the glass and back, substantially as described.

4. A dentist's mirror, comprising a handle, a glass, a back for said glass provided at one side with a handle shank, a split flexible, grooved frame which surrounds said glass and back and is provided at each side of the split with a longitudinally divided sleeve portion adapted to partially embrace said shank, and means for securing said divided sleeve upon the shank, substantially as set forth.

5. A dentist's mirror, comprising a handle, a glass, a back for said glass provided at one side with a handle shank, a split, flexible, grooved frame which surrounds said glass and back and is provided at each side of the split with a longitudinally divided sleeve portion adapted to partially embrace said shank, and means for securing said divided sleeve upon the shank, comprising a collet adapted to fit over the ends of said sleeve and inclosed shank, substantially as set forth.

6. A dentist's mirror, comprising a handle, a glass, a back for said glass provided at one side with a handle shank, a divided, internally grooved frame which surrounds said glass and back, the parts of said frame being hinged together on one side thereof and provided on the opposite side adjacent to their meeting ends with split sleeve portions adapted to embrace said shank, screw threads upon said sleeve portions, and a collet adapted to fit upon said sleeve, substantially as set forth.

In testimony that I claim the foregoing as my invention I affix my signature in presence of two witnesses.

WILBUR FISK GREEN.

Witnesses:
C. CLARENCE POOLE,
L. H. BRACE.